W. F. BOSSE.
SWINGLETREE.
APPLICATION FILED FEB. 19, 1920.
1,347,362. Patented July 20, 1920.
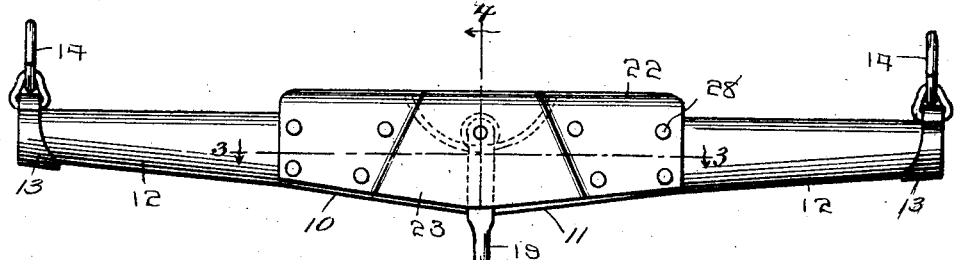
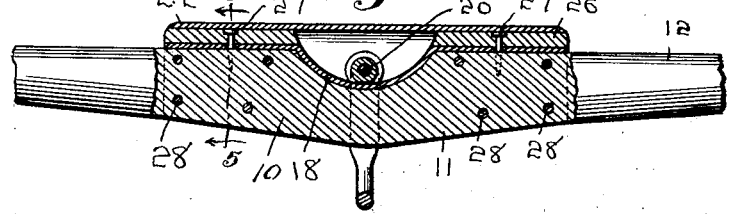
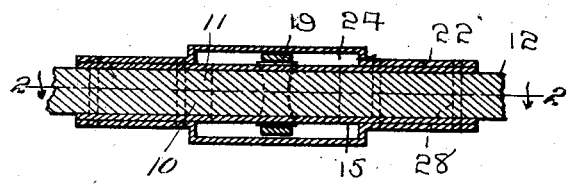
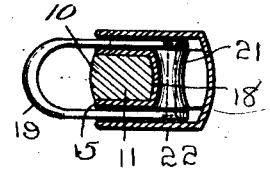
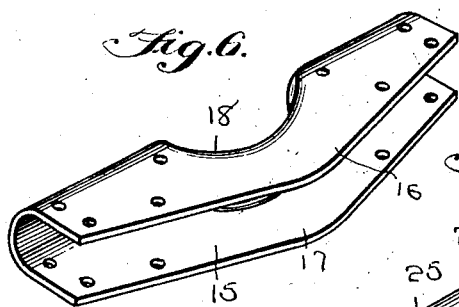
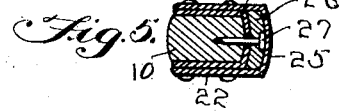
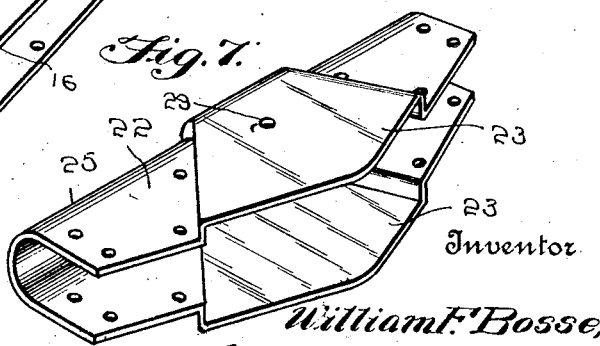
Inventor
William F. Bosse,
By Geo. P. Kimmel
Attorney

UNITED STATES PATENT OFFICE.

WILLIAM F. BOSSE, OF STAMFORD, TEXAS.

SWINGLETREE.

1,347,362.　　　　Specification of Letters Patent.　　Patented July 20, 1920.

Application filed February 19, 1920. Serial No. 359,777.

*To all whom it may concern:*

Be it known that I, WILLIAM F. BOSSE, a citizen of the United States, residing at Stamford, in the county of Jones and State of Texas, have invented certain new and useful Improvements in Swingletrees, of which the following is a specification.

The invention relates to a swingletree or whiffletree and more particularly to the class of self-adjusting or equalizing swingletrees.

The primary object of the invention is the provision of a draft-tree of this character wherein the strain or pull upon the draft animal will be equalized when the traces have been connected in an irregular manner, that is to say, one trace is attached so that the same will be shorter or longer than the other trace when attached, thus relieving possible injury to the draft animal and particularly to the shoulder parts, while the traces will be sustained away from the body of the animal so as to avoid rubbing action thereon.

Another object of the invention is the provision of a draft-tree of this character wherein the construction thereof is novel in the form so that the clevis can be sustained in axial alinement with the center draft of a load, while the swingletree will swing to a position to equalize pull upon a draft animal or animals in the use of the swingletree.

A further object of the invention is the provision of a swingletree of this character, wherein the clevis is mounted thereon in a novel manner and the parts of said swingletree are assembled so as to render it strong without being bulky and of excessive weight, the construction being novel in form to assure the successful operation for equalizing the pull or the resistance of the load in the use of the swingletree.

A still further object of the invention is the provision of a swingletree of this character which is extremely simple in construction, thoroughly efficient and reliable in its purpose, durable and inexpensive to manufacture.

With these and other objects in view the invention comprises the novel features of construction, combination of elements and arrangement of parts which will be more fully described in the following specification and set forth with particularity in the claims appended hereto.

In the accompanying drawing:—

Figure 1 is a top plan view of a swingletree constructed in accordance with the invention.

Fig. 2 is a fragmentary transverse sectional view taken approximately on the line 2—2 of Fig. 3.

Fig. 3 is a sectional view on the line 3—3 of Fig. 1.

Fig. 4 is a sectional view on the line 4—4 of Fig. 1 looking in the direction of the arrow.

Fig. 5 is a sectional view on the line 5—5 of Fig. 2 looking in the direction of the arrow.

Fig. 6 is a perspective view of the inner saddle plate.

Fig. 7 is a perspective view of the outer covering or saddle plate.

Similar reference characters indicate corresponding parts throughout the several views in the drawing.

Referring to the drawing in detail, the draft-tree comprises a beam or bar 10, in this instance shown as made from wood, although the same may be made from metal or any other material having the required rigidity and strength, and is shaped with the wider intermediate portion 11 and outer rounded end portions 12 on the latter on which are fixed ferrules 13 supporting trace attaching devices or connectors 14 of any approved form to which are adapted to be detachably connected the traces of harness for a draft animal.

Fitted upon the widened portion 11 of the beam or bar 10 throughout the greater or full extent thereof is an inner saddle plate 15 formed with the top and bottom checks 16 and 17 respectively which extend over the portion 11 of the bar or beam 10, the edges of said checks being shaped correspondingly to the edge of said bar or beam adjacent thereto, while the intermediate portion of the saddle plate 15 medially thereof is inwardly arched to provide a semi-circular runway 18, the arched portion being fitted within a companion cutaway portion formed in the widened portion 11 of the bar or beam 10 as is clearly shown in Fig. 2 of the drawing.

Spanning the widened portion 11 of the beam or bar 10 is a substantially U-shaped clevis 19 which carries in its ends a stud journal 20 on which is mounted a peripherally grooved roller 21, the latter being adapted for travel upon the wall of the runway 18 in the inner saddle plate 15, the peripheral groove in the roller conforming to the contour of said wall of the runway 18, thus it being seen that the clevis 19 is free for movement and the roller 21 minimizes friction in the movement of the swingletree relative to the clevis as will be obvious.

Fitted over the inner saddle plate 15 is an outer saddle or covering plate 22 which is formed intermediate thereof in the top and bottom portions of the same with outwardly offset panels 23 constituting clearance spaces 24 for the limbs of the clevis 19 which travel in said spaces 24 on swinging movement of the bar or beam 10; the front rounded edge 25 of said outer saddle or cover plate 22 is spaced from the inner saddle plate 15 and interposed therebetween are filling blocks 26 which are held in place by brads or other like fasteners 27 driven therethrough and into the bar or beam 10 as is clearly shown in Fig. 2 of the drawing, thus increasing the runway 18 for the roller 21 of the clevis 19.

The outer and inner saddle plates 22 and 15 are held secure in assembled relation upon the bar or beam 10 through the medium of fasteners 28 which are passed transversely through said plates and the bar or beam, while the top panel 23 of the outer saddle plate 22 has formed therein an oil hole 29 for the introduction of oil onto the stud journal 20 for the roller to enable lubrication thereof.

In the use of the swingletree, should the traces be engaged with the connectors or attaching devices 14 at the ends of the bar or beam 10 so that one trace will be longer relative to the other, the swingletree will automatically adjust itself accordingly to the load for equalizing the pull upon the draft animal at both sides of the center line of draft. The beam or bar 10 can swing to the proper angle with the clevis 19 disposed in alinement with the center of draft, it being understood of course that the clevis 19 is connected with the load in any ordinary well known manner.

From the foregoing it is thought that the construction and manner of operation of the swingletree will be clearly understood and therefore a more extended explanation has been omitted.

It is contemplated that within the scope of the invention the structural features thereof can be employed with doubletrees with equal advantages.

What is claimed is:—

1. A draft appliance of the character described comprising a swinging member having trace-attaching devices at its ends, a clevis loosely connected with the member, a saddle carried by the member and having a concave runway for the clevis to traverse, a covering saddle plate for the first-named saddle, and a roller in the clevis and contacting with the wall of the runway.

2. A draft appliance of the character described comprising a swinging member having trace-attaching devices at its ends, a clevis loosely connected with the member, a saddle carried by the member and having a concave runway for the clevis to traverse, a covering saddle plate for the first-named saddle, and a roller in the clevis and contacting with the wall of the runway, said covering saddle plate having offset medial portions to form clearance spaces for the clevis in its movements.

3. A draft appliance of the character described comprising a swinging member having trace-attaching devices at its ends, a clevis loosely connected with the member, a saddle carried by the member and having a concave runway for the clevis to traverse, a covering saddle plate for the first-named saddle, a roller in the clevis and contacting with the wall of the runway, said covering saddle plate having offset medial portions to form clearance spaces for the clevis in its movements, and filler blocks between the saddle and covering saddle plate.

4. A draft appliance of the character described comprising a swinging member having trace-attaching devices at its ends, a clevis loosely connected with the member, a saddle carried by the member and having a concave runway for the clevis to traverse, a covering saddle plate for the first-named saddle, a roller in the clevis and contacting with the wall of the runway, said covering saddle plate having offset medial portions to form clearance spaces for the clevis in its movements, filler blocks between the saddle and covering saddle plate, and means securing the said saddle, saddle plate and member together.

In testimony whereof I affix my signature hereto.

WILLIAM F. BOSSE.